US012768687B2

(12) United States Patent
Moine

(10) Patent No.: US 12,768,687 B2
(45) Date of Patent: Oct. 20, 2026

(54) METHOD FOR ADAPTING TO THE TOLERANCES OF A SYSTEM COMPRISING A POSITION SENSOR AND A ROTATING TARGET

(71) Applicant: Vitesco Technologies GmbH, Regensburg (DE)

(72) Inventor: Xavier Moine, Toulouse (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 479 days.

(21) Appl. No.: 18/283,588

(22) PCT Filed: Apr. 8, 2022

(86) PCT No.: PCT/EP2022/059361

§ 371 (c)(1),
(2) Date: Sep. 22, 2023

(87) PCT Pub. No.: WO2022/218835

PCT Pub. Date: Oct. 20, 2022

(65) Prior Publication Data

US 2024/0167855 A1 May 23, 2024

(30) Foreign Application Priority Data

Apr. 14, 2021 (FR) ....................................... 2103849

(51) Int. Cl.

*G01D 18/00* (2006.01)
*G01D 3/02* (2006.01)

(Continued)

(52) U.S. Cl.

CPC ........... *G01D 18/001* (2021.05); *G01D 3/022* (2013.01); *G01D 5/145* (2013.01); *G01D 5/2449* (2013.01);

(Continued)

(58) Field of Classification Search

CPC ......... G01P 3/487; G01P 3/488; G01D 5/145; G01D 5/2006; G01D 5/2449; G01D 5/24495; G01D 3/022

(Continued)

(56) References Cited

U.S. PATENT DOCUMENTS 4,715,009 A 12/1987 Böhmler et al.
5,604,304 A 2/1997 Kokubo et al.

(Continued)

FOREIGN PATENT DOCUMENTS

CN 105283768 A 1/2016
CN 110646634 A 1/2020

(Continued)

OTHER PUBLICATIONS

International Search Report and Written Opinion for International Application No. PCT/EP2022/059361, mailed Jul. 15, 2022, 21 pages.

(Continued)

*Primary Examiner* — John H Le

(74) *Attorney, Agent, or Firm* — Buchanan Ingersoll & Rooney PC

(57) ABSTRACT

A method for adapting to the tolerances of a system including at least one position sensor and a rotary target. When the target rotates, the sensor(s) detects (detect) a predefined singularity on the target at an instant T_i, including: acquisition of a series of n+1 instants T_0 to T_N corresponding to a rotation R of the target; determination of theoretical values Theo_i for each instant T_i while considering that the time corresponds to the time that the target takes to effect the rotation R, taking account of any acceleration during the rotation R and as a function of a position of the predefined singularities on an ideal target produced without tolerance; conversion of the time difference between Theo_i and T_i (Continued)

into an angular difference A_i for a corresponding singularity of the target detected by a sensor; and memory-storage of the angular differences A_i for each singularity of the target.

14 Claims, 2 Drawing Sheets

(51) Int. Cl.
*G01D 5/14* (2006.01)
*G01D 5/244* (2006.01)
*G01P 3/487* (2006.01)
*G01P 3/488* (2006.01)

(52) U.S. Cl.
CPC .......... *G01D 5/24495* (2013.01); *G01P 3/487* (2013.01); *G01P 3/488* (2013.01)

(58) Field of Classification Search
USPC .......................................................... 702/105
See application file for complete search history.

(56) References Cited

U.S. PATENT DOCUMENTS

| | | | | |
|---|---|---|---|---|
| 7,262,591 | B2 | 8/2007 | Blossfeld | |
| 7,786,686 | B2 | 8/2010 | D'Angelo et al. | |
| 9,797,747 | B2 | 10/2017 | Sumiya | |
| 10,107,715 | B2 | 10/2018 | Soneda et al. | |
| 10,298,099 | B2 | 5/2019 | Van Ginkel | |
| 10,432,114 | B2 | 10/2019 | Herrada | |
| 11,585,682 | B2 | 2/2023 | Gouzenes et al. | |
| 2004/0251894 | A1 | 12/2004 | Scotson et al. | |
| 2010/0050731 | A1* | 3/2010 | Granig ................. | G01D 5/2449 324/202 |
| 2020/0378802 | A1* | 12/2020 | Yashan ................ | G01D 5/2454 |

FOREIGN PATENT DOCUMENTS

| | | | |
|---|---|---|---|
| EP | 2037118 | A2 | 3/2009 |
| FR | 3043785 | A1 | 5/2017 |
| FR | 3064427 | A1 | 9/2018 |
| FR | 3086387 | A1 | 3/2020 |
| JP | 2005221385 | A | 8/2005 |
| JP | 2017106393 | A | 6/2017 |
| KR | 101382341 | B1 | 4/2014 |
| WO | 0008475 | A1 | 2/2000 |
| WO | 2014/199018 | A1 | 12/2014 |

OTHER PUBLICATIONS

International Search Report and Written Opinion for International Application No. PCT/EP2022/059361, mailed Jul. 15, 2022, 19 pages (French).

Office Action (First Office Action) issued Mar. 19, 2026, by the National Intellectual Property Administration, P. R. China in corresponding Chinese Patent Application No. 202280028448.7 and an English translation of the Office Action. (23 pages).

* cited by examiner

METHOD FOR ADAPTING TO THE TOLERANCES OF A SYSTEM COMPRISING A POSITION SENSOR AND A ROTATING TARGET

CROSS REFERENCE TO RELATED APPLICATIONS

This application is the U.S. National Phase Application of PCT International Application No. PCT/EP2022/059361, filed Apr. 8, 2022, which claims priority to French Patent Application No. 2103849, filed Apr. 14, 2021, the contents of such applications being incorporated by reference herein.

FIELD OF THE INVENTION

The present disclosure relates to a method for adapting to the tolerances of a system comprising a position sensor and a rotating target.

The present disclosure relates more particularly to the field of motors for the automotive industry. One more specific use of the proposed method is concerned with the flux-weakening control of electric motors.

BACKGROUND OF THE INVENTION

It is known practice to measure a rotational speed of the shaft or the like by using a target secured to the shaft and a sensor positioned facing the target. The sensor is adapted to suit the target (or vice versa). For example, use is made of a toothed target associated with a variable-reluctance sensor or else of a target having several magnetic poles and associated with at least one Hall-effect sensor. This then yields an electrical signal in the form of a square wave signal, the frequency of which is then proportional to the speed. The rising and/or falling fronts of the square-wave electrical signal can also be used to determine the position of the shaft and therefore be used for controlling the motor.

The (speed and/or position) measurement then taken is then dependent, on the one hand, on the mechanical defects of the target and/or, on the other hand, on the imprecisions of the sensor(s).

The present disclosure is aimed at providing a method that makes it possible to improve the precision with which the position and/or speed is/are measured using a position sensor and a rotary target.

SUMMARY OF THE INVENTION

The present disclosure improves the situation and proposes a method for adapting to the tolerances of a system comprising at least one position sensor and a rotary target wherein, when the target rotates, the sensor(s) detects (detect) a predefined singularity on the target at an instant T_i.

The proposed method comprises the following steps:

- acquisition of a series of n+1 instants T_0 to T_N corresponding to a rotation R of the target,
- determination of theoretical values Theo_i corresponding to an instant of passing of an ith rising front for each instant T_i while considering that the time (T_N−T_0) corresponds to the time that the target takes to effect the rotation R, taking account of any acceleration there might be during the rotation R and as a function of a position of the predefined singularities on an ideal target produced without tolerance, determined as follows:

$$\text{Theo\_}i=T\_0+i/N(T\_N-T\_0+ACC),\ \text{where}$$

- i is the singularity i considered,
- N is the number of singularities considered for one revolution of the rotary target, and
- ACC is a variable that takes account of the acceleration of the target, determined as follows: (i−N)*(T(N+1)−T_N−T 1+T_0)/2,
- conversion of the time difference between Theo_i and T_i into an angular difference A_i for a corresponding singularity of the target detected by a sensor, and
- memory-storage of the angular differences A_i for each singularity of the target.

Thus, the proposal here is to take account of several measurements taken and to adapt the measurements taken with respect to theoretical measurement results and then after a learning phase provide corrective terms that allow a measurement taken to be corrected.

The features set out in the following paragraphs can optionally be implemented independently of one another or in combination with one another:

- said method is implemented only when the rotational speed of the target exceeds a predetermined limit speed;
- said method is implemented only when the rotational speed of the target is substantially stable, which is to say if the acceleration (positive, or negative in the case of a deceleration) of the target is comprised within a predetermined range;
- the rotation R of the target corresponds to a full revolution, namely 360°.

The present disclosure is particularly well suited to a method for controlling a brushless DC electric machine comprising a rotor and a stator, wherein a set of three Hall-effect sensors is positioned facing a target exhibiting at least one pair of magnetic poles and wherein each transition of a sensor from one magnetic pole to another occurs at an instant T_i.

According to the present disclosure, this method comprises the following steps:

- acquisition of a series of n+1 instants T_0 to T_N corresponding to a rotation R of the target,
- determination of theoretical values Theo_i corresponding to an instant of passing of an ith rising front for each instant T_i while considering that the time (T_N−T_0) corresponds to the time that the target takes to effect the rotation R, taking account of any acceleration there might be, which is then assumed to be constant, during the rotation R and as a function of a position of the predefined singularities on an ideal target produced without tolerance, determined as follows:

$$\text{Theo\_}i=T\_0+i/N(T\_N-T\_0+ACC),\ \text{where}$$

- i is the singularity i considered,
- N is the number of singularities considered for one revolution of the rotary target, and
- ACC is a variable that takes account of the acceleration of the target, determined as follows: (i−N)*(T(N+1)−T_N−T 1+T_0)/2,
- conversion of the time difference between Theo_i and T_i into an angular difference A_i for a corresponding singularity of the target detected by a sensor, and
- memory-storage of the angular differences A_i for each singularity of the target, and in flux-weakening mode, the voltage in each phase of the machine is controlled while taking account of the angular differences stored in memory.

Another aspect proposes a computer program, comprising program code instructions for carrying out all the steps of the method described hereinabove when said program is executed on a computer.

Another aspect proposes a computer-readable medium on which there is recorded a program according to the preceding paragraph.

Another aspect proposes a brushless DC electric machine comprising a stator comprising windings able to be subjected to an operating voltage, a rotor producing a magnetic field.

This electric machine comprises three Hall-effect sensors facing a target comprising at least one pair of magnetic poles, and said electric machine comprises control means for implementing each of the steps of a method described hereinabove for controlling an electric machine.

This electric machine may advantageously further comprise a fourth Hall-effect sensor for determining a reference position for the rotor of the machine.

Finally, the present disclosure also relates to a motor vehicle comprising an electric machine as defined in the preceding paragraphs.

BRIEF DESCRIPTION OF THE DRAWINGS

Further features, details and advantages will become apparent on reading the following detailed description, and on studying the appended drawings, in which.

DETAILED DESCRIPTION OF THE EMBODIMENTS

Figure 1:
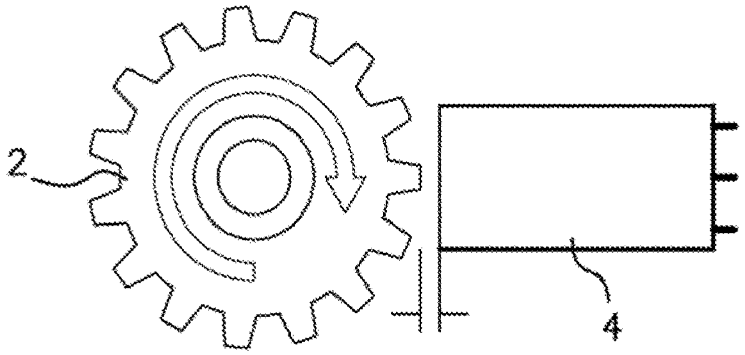
FIG. 1 schematically depicts a first example of a sensor and of a corresponding target.

Reference is now made to FIG. 1. A person skilled in the art will recognize here a target 2 driven in rotation, and a sensor 4 positioned facing the target so as to determine, for example, the rotational speed of the target.

The target 2 is made from a ferromagnetic material. It takes the form of a disk having a crenellated peripheral surface. As a preference, the projecting shapes are all similar and uniformly distributed around the periphery of the target 2. Furthermore, an angular sector of a projecting shape, or tooth, of the target subtends the same angle at the center of the target as a recess positioned between two adjacent teeth.

The sensor 4 is for example an inductive sensor of the variable-reluctance sensor type. Such a sensor 4 facing toward the axis of the target 2 and perpendicular to this axis is able to detect the passing of each of the teeth of the target 2. A space comprised within a distance interval that is dependent on the sensor 4 and on the material of the target 2, and illustrated in FIG. 1, is provided between the top of a tooth and a distal end of the sensor 4. Such a sensor 4 is generally designed to detect either the rising fronts or the falling fronts of the crenellated shape. Depending on the nature of the sensor 4, each time a front, for example a rising front, passes by, the sensor 4 at an instant T_i, produces a signal indicating the passing of an ith rising (in the example chosen) front.

When the target 2 is rotating, the teeth of the target 2 file past the sensor 4 and on each passing of a rising front of a tooth a signal is triggered at an instant T_i. In order to determine the rotational speed of the target, if the rising (in the example chosen) fronts are supposed to be uniformly distributed about the periphery of the target, and if there are N rising fronts, the instantaneous rotational speed VR, in revolutions/minute, can be obtained using the following formula:

$$VR\_i=60/(N^*(T\_i-T\_i-1)) \tag{1}$$

where T_i is in seconds.

It may be noted that this formula is in fact highly sensitive to irregularities in the geometry of the target and also in the positioning of the sensor. As there is no such thing as a perfect target, there will necessarily be target teeth that are broader than others as a result of the manufacturing tolerances. Further, the axis of rotation of the target 2 may be very slightly off-centered with respect to the geometric axis of the target 2. All of these tolerances have an influence on the measurements T_i. In addition, if the relative position of the sensor 4 with respect to a tooth of the target 2 changes, that too may influence the value of T_i.

It is therefore possible to filter the measured values. However, that method makes the system less responsive at detecting a change in the rotational speed.

What is therefore proposed here, in order to improve the measurement precision, is to calculate a rotational speed over the passing of a plurality of teeth, for example over a complete revolution of the target 2. The first measurement T_0 and the measurement T_N of the chosen portion of the target are therefore taken into consideration. What is preferably used is one complete revolution of the target, and it is this particular embodiment that will be described hereinafter by way of nonlimiting illustration. This makes it possible to experience the same measurement conditions twice, since at the end of one revolution it is the same front of the same tooth that lies facing the sensor. The rotational speed VR is then expressed by the following formula:

$$VR=60/(T\_N-T\_0) \tag{2}$$

Here, given that the value (T_N−T_0) is N times greater than a value (T_i−T_(i−1)), the same error in the value T_N or T_0 as in a value T_i will carry less penalty in the determination of the rotational speed of the target 2.

In order to employ this strategy, it is possible to count the number of rising fronts (or falling fronts depending on the sensor) seen by the sensor 4 and to select accordingly the measurements taken for determining the rotational speed.

Another solution is to create a singularity at the periphery of the target by, for example, eliminating one tooth or indeed two successive teeth. In that way, a measurement is taken each time the singularity passes by, and the rotational speed is calculated by calculating the frequency at which the singularity passes past the target 2.

This method proposed here makes it possible to achieve an improvement in the measurement of the rotational speed. However, it does not make it possible to detect a variation in speed as the target rotates.

The present disclosure therefore proposes implementing a learning procedure as explained hereinbelow so as to be able to overcome the effect of the manufacturing tolerances of the target and/or of the tolerances within which the sensor is positioned relative to the target.

As a preference, the procedure which follows is implemented when the rotational speed is relatively high (for example greater than half the maximum rotational speed). It is then assumed that the rotational speed is high enough that the variations in torque have no appreciable effect on the instantaneous variations in speed because of the inertia of the rotating mechanical assembly. Under such conditions, the proposal is to carry out a learning of the fronts to be taken into consideration. It is assumed hereinafter that these are rising fronts. The same procedure of course applies if the falling fronts or even all the fronts are considered. It is estimated here that the rotational speed is constant or at the very least that the acceleration or the deceleration of the target is limited.

As already suggested above, it is possible to implement the procedure proposed here on a portion of the target, for example ⅓ or ¼ of the target, but it is chosen here to implement it over 360°. Over one complete rotation, therefore, the times T_i of passing the rising front, for i ranging from 0 to (N+1) are taken and stored in memory. The measurement T_0 corresponding to the same front as the measurement T_N, but for the next revolution. The same can be said of the measurements T_1 and T_(N+1). The value (T_N−T_0) corresponds to the measured time taken for the target 2 to effect one rotation.

From these measurements it is possible to determine the theoretical times Tth_i of passing of the rising fronts. In the calculation that follows, it is assumed that the rising fronts are uniformly distributed (on an ideal target) but the same principle can be applied to special cases. It is within the competence of a person skilled in the art to apply the calculation procedure below to a distribution of the rising fronts that is other than uniform.

$$Tth\_i=T\_0+i/N(T\_N-T\_0+ACC) \quad (3)$$

Tth_i corresponds to the instant of passing of an ith rising front

N is the total number of rising fronts

ACC is a variable that takes account of the acceleration (positive, or negative in the case of a deceleration) of the target. ACC is given by the following formula:

$$ACC=(i-N)*(T(N+1)-T\_N-T\_1+T\_0)/2 \quad (4)$$

It may be noted that, at constant speed, ACC is equal to 0 (or is negligible) because then T_(N+1)−T_N−T 1+T_0 is equal to 0, since the time taken to pass from one tooth to another remains constant.

The time offset between the measurements (T_i) taken and the theoretical passing times Tth_i is then known. However, these times are valid only for a very precise rotational speed. The time offsets determined above therefore need to be converted into angular offsets Alpha_i on the target. This conversion is given by the formula:

$$Alpha\_i=360*(Tth\_i-T\_i)/(T\_N-T\_0) \quad (5)$$

T_i is the instant of passing of the rising front i as given by the sensor 4.

Tth_i is the theoretical value of the time of passing of the rising front i.

It may be noted that the offset Alpha_i is determined in such a way that the offset Alpha_0 is zero or, in other words, the offset Alpha is determined with respect to the first rising front considered.

Figure 4:
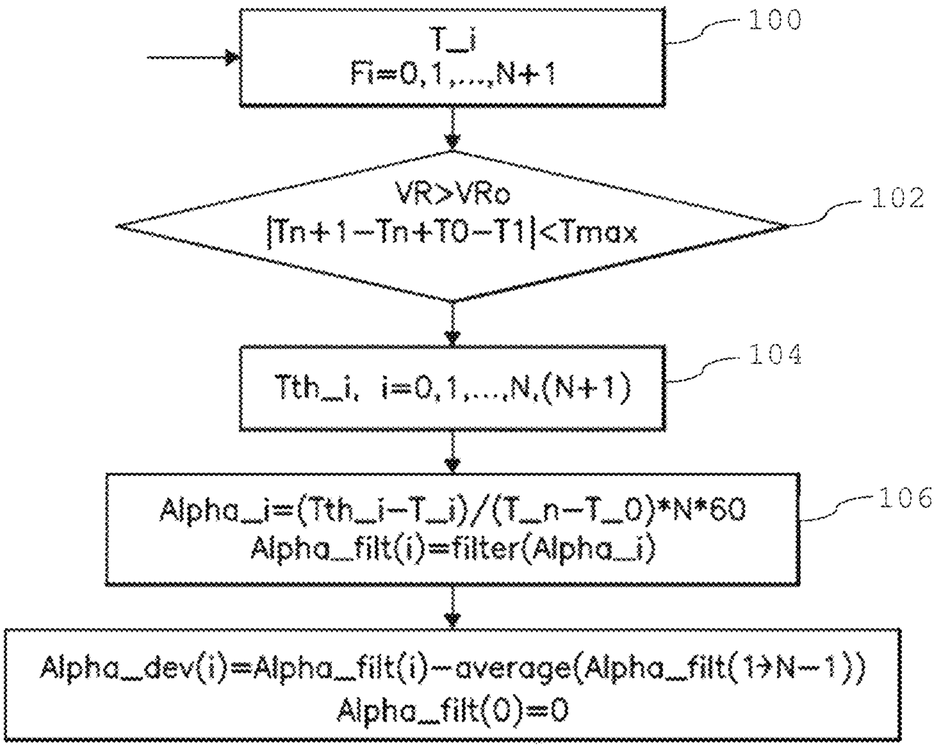
FIG. 4 depicts a flow diagram for a method of learning within the context of the present disclosure.

FIG. 4 is a logic diagram corresponding to one advantageous implementation of the present disclosure. During a first step 100, data from the sensor 4 allow the instants T_i corresponding to a complete revolution plus one tooth of the target to be captured and stored in memory.

Next, it is necessary to verify that the acquisitions made have been captured under suitable conditions: is the rotational speed VR sufficient? This speed can be calculated from the time (T_N−T_0). FIG. 4 proposes ensuring that VR is above a limit value VRo. Alternatively, provision may also be made for the value of the duration of rotation of the target, namely (T_N−T_0), to be below a predefined duration Tmin corresponding to VRo.

Provision is also made for the acceleration of the target to be limited. Provision is made here for the variation in the time taken to pass between two successive teeth at the start of measurement (T_1−T_0) and at the end of measurement (T_N+1−T_N) to be below a value Tmax. Here (FIG. 4, step 102), the one same limit is provided for acceleration as for deceleration, but different values for acceleration and deceleration could be provided.

A third step 104, performed only if the conditions of the second step 102 are met, itself provides for calculating the theoretical instants of passing Tth_i of the rising fronts of the target, using equations (3) and (4).

The next step (fourth step 106) implements equation (5) to convert the difference between the theoretical time and the measured time into an angular difference alpha_i for each rising front.

When several alpha_i values are determined during the course of successive rotations of the target 2 under conditions corresponding to those defined in the second step 102, a filtering of the obtained values may be performed.

When filtering is performed, provision may be made in a fifth step for determining, for each rising front, a filtered corrective angular value Alpha_dev(i). The following equation may be provided for doing this:

$$Alpha\_dev(i)=Alpha\_filt(i)-average(Alpha\_filt(1, \ldots, N-1)) \quad (6)$$

where average (Alpha_filt (1, . . . , N−1)) is a mean value of the alpha_filt(i) values for i ranging from 1 to (N−1).

The value Alpha_dev(i) is then used in the measurements taken by the sensor 4 to correct the angular values given by this sensor. When a rising front is detected, this front corresponds to an angular value of the position of the target, which value is then corrected using the filtered alpha_dev(i) value. In this way, deficiencies in the manufacturing and mounting tolerances for the target 2 can be corrected.

Figure 2:
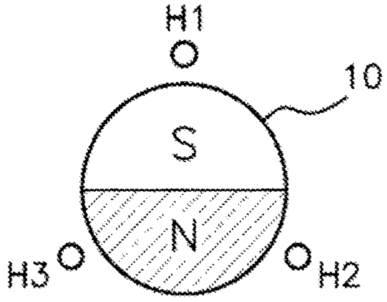
FIG. 2 schematically depicts a second example with a plurality of sensors and a corresponding target.
Figure 3:
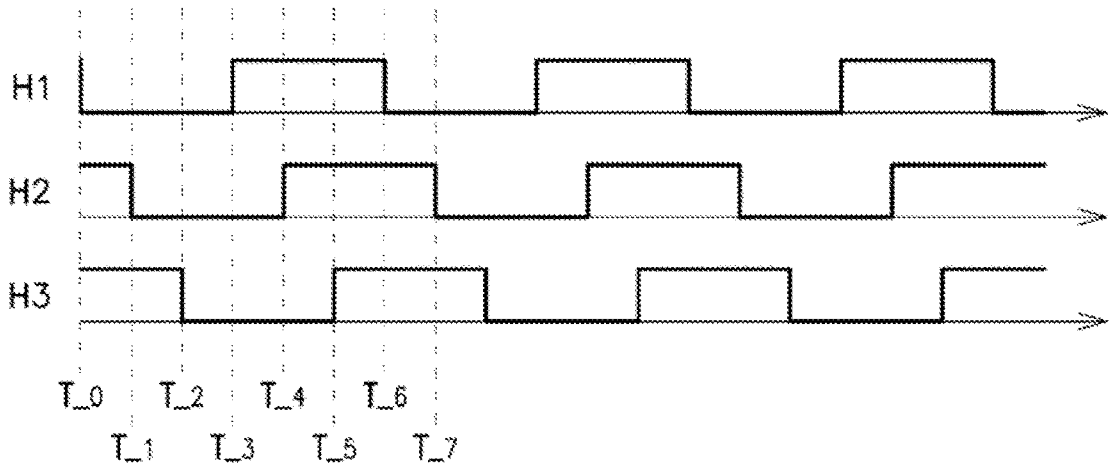
FIG. 3 schematically depicts signals emitted by the sensors of FIG. 2.

FIGS. 2 and 3 illustrate another example of the measuring of the position and speed of a rotary assembly. The issue here is that of taking measurements for controlling a brushless electric motor. This may for example be an electric motor for the propulsion of a vehicle, whether this be a so-called electric vehicle (driven solely by one or more electric motor(s)) or else a so-called hybrid vehicle having at least one electric motor and an internal combustion engine. This may also be some other type of electric motor (or system), for example an integrated starter/alternator.

Such a brushless electrical system comprises for example a rotor 10 having at least one permanent magnet exhibiting a south pole S and a north pole N. It is assumed here that the rotor 10 exhibits a single pair of poles, but a greater number of pairs of poles could be anticipated without departing from the scope of the present disclosure. This motor also comprises a stator having windings which are alternately supplied with electrical current. The position of the rotor 10 determines which winding(s) is (are) to be supplied with current.

In order to determine the position of the rotor 10, it is known practice to place Hall-effect sensors H1, H2 and H3 between the windings of the stator in order to detect the position of the rotor 10. These sensors are uniformly distributed about the rotor. For a rotor having n pairs of poles, the sensors would be uniformly distributed at 360°/n.

FIG. 3 illustrates the signals supplied by the three Hall-effect sensors H1, H2 and H3. Each change in the pole passing past a sensor is manifested in a rising front or falling front, depending on the change in polarity concerned. Given the position of the sensors, six fronts are obtained at instants T_0 to T_5, as illustrated. Each front corresponds to a rotation by 360°/6 namely 60° from the preceding front.

On the basis of the signals supplied by the three Hall-effect sensors, the windings of the stator are supplied with electrical current. Under certain conditions, the detection of a front may directly trigger the supply of current to a corresponding winding of the stator. Under certain other conditions, notably at high speed when a driving torque is to be supplied, in flux-weakening mode, the windings need to be supplied with current in advance of the detection of a front from the signals supplied by the Hall-effect sensors.

The control of an electric motor or, more broadly, of an electric machine, is highly sensitive to the precision of the sensors. Unsuitable sensors may lead to an appreciable reduction in the performance of the machine, and the machine therefore ends up supplying a torque that is lower than that intended and/or consuming excessive amounts of current and/or not supplying the expected torque.

In such usage, it is therefore important to have sensors of great precision, or at the very least to know with precision the position of the rotor of the electric machine and/or the rotational speed of this rotor.

It is therefore advantageously proposed here to implement the method described above in order to obtain great precision on the data supplied by the Hall-effect sensors H1, H2 and H3, even if these need to be slightly offset or incorrectly oriented with respect to their optimal position.

The method illustrated in FIG. 4 is therefore implemented with N=6 when the rotational speed of the motor (or of the machine: it is considered hereinafter that the term motor also encompasses electric machines such as an alternator-starter for example) is high enough that the variations in torque do not appreciably alter the variations in speed that are due to the inertia of the motor.

As described previously, the times T_i corresponding to the fronts illustrated in FIG. 3 are taken for T_0 to T_7. From these measurements it is determined, on the one hand, whether the rotational speed of the motor is high enough and, on the other hand, whether the variation in this rotational speed (or velocity) is comprised within predetermined limits. Here again, it is possible to have a different limit for acceleration compared with deceleration.

Formulae (3) and (4) above can be used to calculate the theoretical times Tth_i of passing for the fronts 1 to 5. It is effectively assumed that the instants of passing T-0 and T_6 are reference values, namely:

Tth_0=T_0 and

Tth_6=T_6.

Specifically, the measurements taken at T_0 and at T_6 are taken under similar conditions and for these two measurements, the relative position of the sensors and of the target, in this case the rotor 10, are the same.

It is considered that the theoretical passing times correspond to the times of passing into positions 60°, 120°, 180°, 240° and 300°. The time difference between the theoretical values Tth_i and the measured times T_i of passing correspond to an angular offset alpha_i which is measured using equation (5).

If a plurality of learning phases are conducted, the values of the angular offsets can be filtered in order to further increase the precision of the method.

Figure 5:
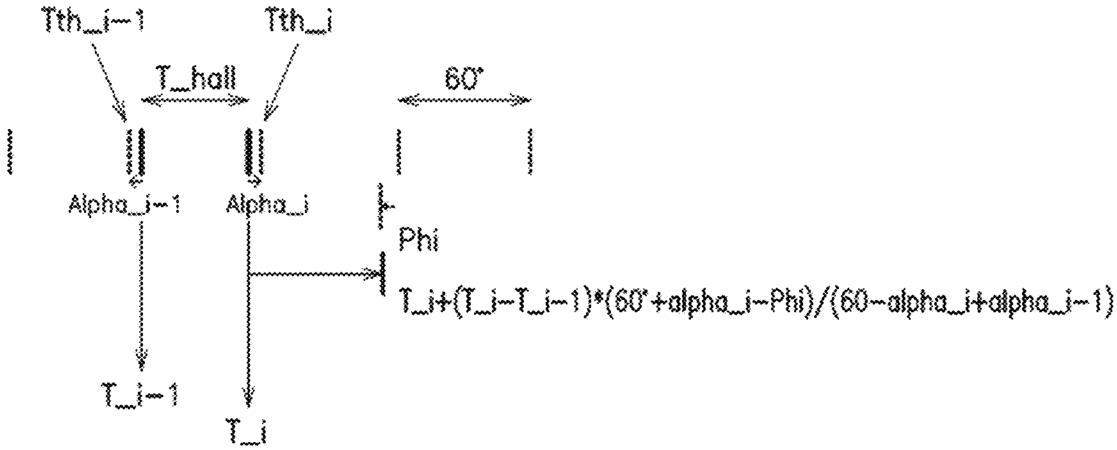
FIG. 5 is an illustrative diagram of the present disclosure as applied to the control of an electric motor.

FIG. 5 illustrates one application of the control of a motor on the basis of the values defined hereinabove.

It is assumed in this figure that a horizontal axis corresponds to the time axis. The theoretical times of passing of the detected changes in poles, which are therefore in each instance spaced 60° one from the next, are indicated in dotted line. Also indicated, in solid line, are the instants T_i−1 and T_i which correspond to two instants measured successively by the Hall-effect sensors H1, H2 and/or H3.

The difference (Tth_i−1)−(T_i−1) corresponds to an angular offset Alpha_i−1.

Likewise, the difference Tth_i−T_i corresponds to an angular offset Alpha_i.

When the issue is that of measuring the rotational speed of the rotor 10, the speed measurement is performed on the basis of the theoretical measurements. This speed may be calculated for example using one of the following two formulae, considering that there is theoretically one front every 60°, namely six fronts per revolution:

In revolutions/minute, the rotational speed is equal to 360*N/(Tth_i−Tth_i−1), where N=6 and the times are expressed in seconds.

Or alternatively: 360*(60°+Alpha_i−Alpha_i−1)/(T_i−T_i−1)

When the supply of electrical power to a motor is also to be controlled as a function of the detected fronts, a correction also preferably needs to be applied. It is assumed for example that the motor is under operating conditions such that the supply of power to the windings is to be made with an advance angle Phi. FIG. 5 illustrates the case where Phi=10°.

In this case of figure (FIG. 5), the command to supply current to the winding will be issued at the instant TC, where:

$$TC=T\_i+(T\_i-T\_i-1)*(60+\text{Alpha}\_i-Phi)/(60-\text{Alpha}\_i+\text{Alpha}\_i-1)$$

This command is thus issued on the basis of the measured times and with corrections determined during the course of the learning phase.

If it is necessary, in an application for example to an alternator-starter, to know the precise position of the rotor, then it is possible to add a fourth Hall-effect sensor. By combining the information from this fourth sensor with that supplied by the other three, it is then possible to determine the absolute position of the rotor.

The present disclosure thus makes it possible to increase the precision of a sensor. It makes it possible to compensate for imprecision in a measurement from a sensor and also for the tolerances on the positioning of a sensor in an assembly comprising a rotating part.

The manufacture of a system implementing a method according to the present disclosure is simplified because it is possible, with wider tolerances, to nevertheless obtain measurements of adequate precision.

The present disclosure is particularly well suited to the control and operation of an electric machine, notably a DC machine and more particularly a brushless machine.

The better precision supplied by the present disclosure stems first of all from the fact that the calculations, of speed for example, are performed while taking account not of just two time measurements but of a greater number of measurements, preferably of at least all of the measurements taken between two measurements that correspond to the one same relative position of the sensor with respect to its target. This means that the error in one measurement can be reduced by spreading a measurement error over a plurality of measurements. Thus the error is not as great.

The learning proposed by the present disclosure makes it possible to take account of the deficiencies in alignment and the mechanical imprecisions of the system. It is also possible here to take account of asymmetric behaviors of a sensor (for example if rising and falling fronts are measured using the one same sensor).

The learning also makes it possible to take account of imprecisions regarding the target. Whether the target is a machined target exhibiting teeth at its periphery, or a magnetic target, imprecisions are introduced by the machining of the teeth or else by the fact that the passing from one magnetic pole to another does not necessarily occur exactly at the theoretical location intended for this.

The present disclosure is not limited to the exemplary embodiments described hereinabove, or to the variants envisioned, solely by way of examples, but it encompasses all the variants that those skilled in the art may envision within the context of the protection sought.

The invention claimed is:

1. A computer-implemented method for adapting to the tolerances of a system including at least one position sensor, a rotary target having plural teeth, and a stator with plural windings wherein, when the target rotates, the sensor(s) detects a predefined singularity on the target at an instant T_i, the method comprising:

- detecting, by the at least one position sensor, a rising front of each tooth of the rotary target as the tooth passes the at least one position sensor;
- acquiring, by the computer, a series of n+1 instants T_0 to T_N corresponding to a rotation R of the target, each n+1 instant being associated with the rising front of respective tooth of the rotary target;
- determining, by the computer, theoretical values Theo_i corresponding to an instant of passing of an ith rising front for each instant T_i while considering that the time corresponds to the time that the target takes to effect the rotation R, taking account of any acceleration there might be during the rotation R and as a function of a position of the predefined singularities on an ideal target produced without tolerance, determined as follows:

$$Theo\_i=T\_0+i/N(T\_N-T\_0+ACC), \text{ where}$$

- i is the singularity i considered,
  - N is the number of singularities considered for one revolution of the rotary target, and
  - ACC is a variable that takes account of the acceleration of the target, determined as follows: (i−N)*(T_(N+1)−T_N−T_1+T_0)/2, and

- the method further comprising:
  - converting, by the computer, the time difference between Theo_i and T_i into an angular difference A_i for a corresponding singularity of the target detected by a sensor,
  - storing, by the computer, the angular differences A_i for each singularity of the target, and
  - controlling, by the computer for a flux-weakening mode of the stator, a voltage in each phase of the machine by triggering a supply of current to one of the plural windings of the stator before the rising front of each tooth of the rotary target is detected based on the angular differences stored in memory.

2. The method as claimed in claim 1, wherein the method is implemented only when the rotational speed of the target exceeds a predetermined limit speed.

3. The method as claimed in claim 1, wherein the method is implemented only when the rotational speed of the target is substantially stable, which is to say if the acceleration (positive, or negative in the case of a deceleration) of the target is comprised within a predetermined range.

4. The method as claimed in claim 1, wherein the rotation R of the target corresponds to a full revolution, namely 360°.

5. The method of claim 1, wherein the rotary target includes plural teeth and each tooth corresponds to the ith rising front for each instant T_i.

6. A computer-implemented method for controlling a brushless DC electric machine comprising a rotor and a stator, wherein a set of three Hall-effect sensors is positioned facing a target exhibiting at least one pair of magnetic poles and wherein each transition of a sensor from one magnetic pole to another occurs at an instant T_i, the method comprising:

- acquiring, by the sensor for each transition from one magnetic pole to another, a series of n+1 instants T_0 to T_N corresponding to a rotation R of the target,
- determining, by the computer, theoretical values Theo_i corresponding to an instant of passing of an ith rising front for each instant T_i while considering that the time corresponds to the time that the target takes to effect the rotation R, taking account of any acceleration there might be, which is then assumed to be constant, during the rotation R and as a function of a position of the predefined singularities on an ideal target produced without tolerance, determined as follows:

$$Theo\_i=T\_0+i/N(T\_N-T\_0+ACC), \text{ where}$$

- i is the singularity i considered,
  - N is the number of singularities considered for one revolution of the rotary target, and
  - ACC is a variable that takes account of the acceleration of the target, determined as follows: (i−N)*(T_(N+1)−T_N−T_1+T_0)/2, and

- the method further comprising:
  - converting, by the computer, the time difference between Theo_i and T_i into an angular difference A_i for a corresponding singularity of the target detected by a sensor, and
  - storing, by the computer, the angular differences A_i for each singularity of the target, and
  - controlling, by the computer, in flux-weakening mode, a voltage in each phase of the machine by triggering a supply of current to one of the plural windings of the stator before the rising front of each tooth of the rotary target is detected based on the angular differences stored in memory.

7. The method of claim 6, wherein the electric machine includes a fourth Hall-effect sensor, the method further comprising:

- determining an absolute position of the rotor from the data obtained via the four Hall-effect sensors is used to determine an absolute position of the rotor.

8. A non-transitory computer readable medium storing program code instructions for execution by a computer, the computer being included in a system having at least one position sensor and a rotary target wherein, when the target rotates, the sensor(s) detects a predefined singularity on the target at an instant T_i, the program code instructions causing the computer to be configured to:

acquire a series of n+1 instants T_0 to T_N corresponding to a rotation R of the target, determine theoretical values Theo_i corresponding to an instant of passing of an ith rising front for each instant T_i while considering that the time corresponds to the time that the target takes to effect the rotation R, taking account of any acceleration there might be during the rotation R and as a function of a position of the predefined singularities on an ideal target produced without tolerance, determined as follows:

$$Theo\_i=T\_0+i/N(T\_N-T\_0+ACC)$$, where i is the singularity i considered,

N is the number of singularities considered for one revolution of the rotary target, and ACC is a variable that takes account of the acceleration of the target, determined as follows: (i−N)*(T (N+1)−T_N−T 1+T_0)/2, and the computer being further configured to:

convert of the time difference between Theo_i and T_i into an angular difference A_i for a corresponding singularity of the target detected by a sensor, and store the angular differences A_i for each singularity of the target, and control, for a flux-weakening mode of the stator, a voltage in each phase of the machine by triggering a supply of current to one of the plural windings of the stator before the rising front of each tooth of the rotary target is detected based on the angular differences stored in memory.

9. A brushless DC electric machine comprising a stator comprising windings able to be subjected to an operating voltage, a rotor producing a magnetic field, comprising three Hall-effect sensors facing a target comprising at least one pair of magnetic poles, and said electric machine comprises control means being configured for controlling an electric machine by the non-transitory computer readable medium as claimed in claim 8.

10. The electric machine as claimed in claim 9, further comprising a fourth Hall-effect sensor for determining a reference position for the rotor of the machine.

11. A motor vehicle comprising an electric machine as claimed in claim 10.

12. The motor vehicle of claim 11, wherein data obtained from the four Hall-effect sensors is used to determine an absolute position of the rotor.

13. The motor vehicle of claim 11, wherein the rotor includes plural teeth and each tooth corresponds to the ith rising front for each instant T_i.

14. The non-transitory computer-readable medium of claim 8, wherein the rotary target includes plural teeth and each tooth corresponds to the ith rising front for each instant T_i.

* * * * *